Feb. 24, 1959

A. D. SCHULTZ 2,874,867

FUEL CONTAINER CLOSURE

Filed Nov. 5, 1953

INVENTOR.
ARTHUR D. SCHULTZ
BY
*McDonald & Feagans*
ATTORNEYS

United States Patent Office 2,874,867
Patented Feb. 24, 1959

2,874,867

FUEL CONTAINER CLOSURE

Arthur D. Schultz, Cleveland, Ohio, assignor to Eaton Manufacturing Company, Cleveland, Ohio, a corporation of Ohio Application November 5, 1953, Serial No. 390,330

5 Claims. (Cl. 220—44)

This invention relates to closures for fuel containers and more particularly to valve closures or caps for fuel tanks of vehicles and the like.

Broadly the invention comprehends the provision of an automotive vehicle fuel tank closure of novel design incorporating pressure and vacuum relief valve means therein.

Among the principal objects of the invention is the provision of a fuel container closure of the valve type, that:

(a) Is economical of construction and effective in use;

(b) Includes therein a pressure relief valve and a vacuum relief valve; and, (c) Incorporates therein pressure and vacuum relief valves having a common annular seal therebetween and wherein the vacuum relief valve can be resiliently loaded or free floating.

Other objects and advantages of the invention will appear from the following description taken in connection with the drawings forming a part of the specification, and in which.

Similar reference characters indicate corresponding parts throughout the several views of the drawings.

Figure 1:
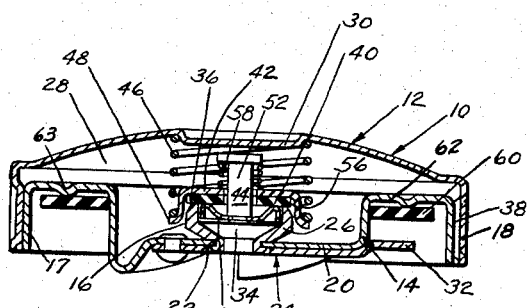
Fig. 1 is a vertical cross-sectional view of a fuel cap, constituting the invention.

This fuel cap was devised primarily for the purpose of providing an economical and efficient pressure and vacuum relief operative cap for use in connection with fuel tanks of automotive vehicles and the like. The cap was intended in part to be operative to seal the fuel tank to which applied to be effective to prevent leakage of the fuel from the tank as a result of surge of the fuel therein, which surge would normally cause spillage from the tank if not so prevented. In the case of making the vacuum valve free floating the surge of fuel toward the relief opening in the cap operates to move the vacuum relief valve to closed position to inhibit leakage through said relief opening whereas in the structure wherein a spring biases the vacuum valve to closed position surge of the fuel is automatically prevented from leaking past the cap independent of the surge movement of the fuel against the vacuum valve. Economy of structure as well as effective sealing of the pressure and vacuum relief valves is possible with the instant structure by reason of the provision of a single annular sealing member, of rubber or like composition, upon which both the pressure and vacuum relief valves seat. The vacuum relief valve can be made either free floating or spring loaded depending upon the applicational use of the cap.

Referring to the drawings for more specific details of the invention 10 represents generally a fuel container closure or cap.

Cap 10 comprises basically a cup-shaped cover 12, a somewhat cup-shaped member 14 arranged internally of and fixedly secured to cover 12, and a combination pressure and vacuum relief valve assembly 16.

Member 14 includes a reversely bent annular outer skirt portion 17 press-fitted into secured relation with a skirt portion 18 of cover 12. Central portion 20 of member 14 has a central opening 22 therein and has fixedly mounted on one side thereof a spring metal member 24. A stepped bore sleeve member 26 is secured in the opening 22 of member 14 and extending axially away from the side of portion 20 opposite to the mounting of member 24. As arranged on central portion 20 of member 14, sleeve member 26 extends axially, in a chamber 28 formed between cover 12 and member 14, toward the under or inside of a central depressed portion 30 of cover 12.

Spring metal member 24 is riveted or otherwise suitably secured to the central portion 20 of member 14, and includes diametrically opposed locking fingers 32, adapted for engagement with inside locking flanges or cams of a filler tank neck, not shown, to which the cap is applicable.

Sleeve member 26, forms part of the pressure and vacuum relief assembly and as such has a central passage 34 therethrough providing communication between chamber 28 of the cap and a zone on the opposite side of member 14 from the chamber and an annular valve seating surface 36 at one extremity thereof axially spaced from member 14 and cover 12 within chamber 28. Communication of chamber 28 with a zone externally of the cap is had by way of a plurality of circumferentially spaced axial passages 38, provided between the skirts of cover 12 and member 14 as a result of the knurled formation of the skirt of cover 12.

Relief valve assembly 16 in addition to sleeve member 26 includes an annular rubber sealing element 40, a cup-shaped member 42, a vacuum relief valve 44, and a coil spring 46.

Annular sealing element 40, is arranged in chamber 28 to bear, over an annular area on one axial side thereof, in sealing relation upon valve seat 36 of sleeve member 26. Element 40 is received internally of cup-shaped member 42 and is pressed into normal sealing engagement with valve seat 36 by spring 46 disposed in chamber 28 axially between cover 12 and member 42. As so arranged spring 46 bears at one end upon an outer annular flange 48 of member 42 and fits circumferentially at its other end about the inner protrusion formed by way of depression 30 of cover 12 on the opposite side therefrom.

Valve 44 as disclosed by Fig. 1 includes an annular element 50 disposed within passage 34 of sleeve 26 and a shank member 52 secured to element 50 and arranged in axial extending relation through the central opening in sealing element 40 and a central opening 54 provided in member 42. An annular portion 56 of element 50 is impressed into sealing engagement with an annular area of sealing element 40 inward radially of the sealing engagement of valve seat 36 with element 40, by way of a light coil spring 58 arranged axially between one extremity of shank 52 and cup-shaped member 42. One axial extremity of the skirt of valve 44 is purposely made annularly irregular so that upon the movement of the valve off its sealing position with element 40 a passage is provided annularly thereabout through the bore of sleeve 26, wherein the valve bottoms on the shoulder between the different diametered portions of the bore of the sleeve.

Central opening 54 of member 42 and the central opening of sealing element 40 provides annular clearance space around shank member 52 permitting of communication of chamber 28 through passage 34 when portion 56 of element 50 is not in engagement with sealing element 40.

An annular sealing gasket 60 arranged axially intermediate an annular portion 62 of member 14 and locking fingers 32 of member 24 is properly seated and positioned, by circumferential spaced small projections 63 formed on portion 62 of member 14, against which it axially bears. Sealing gasket 60 is adapted to be engageable with the outer rim of a filler neck of a container to which the cap is applied.

In the operative utilization of cap 10 with the cap secured upon a container therefor the relief valve assembly is closed, that is, no air or gas can enter or escape from the container. If pressure builds up in the container in excess of an amount to which the cap is calibrated the sealing element 40 and cup-shaped member are moved axially against spring 46 to thus disengage the sealing element from the valve seat 36 to thus permit of the escape of gas or air from the interior of the container by way of the bore of the sleeve chamber 28 and passages 38 to the atmosphere.

If a vacuum should occur in the container to which cap 10 is applied the valve 44 is moved off its seat on sealing element 40 permitting of the passage of air from the atmosphere through passages 38, chamber 28, the central opening 54 in member 42, central opening of element 40, and the bore of sleeve 26.

Figure 2:
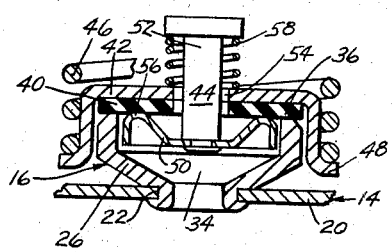
Fig. 2 is an enlarged vertical cross-sectional view of the pressure and vacuum relief valves incorporated in the cap of Fig. 1.
Figure 3:
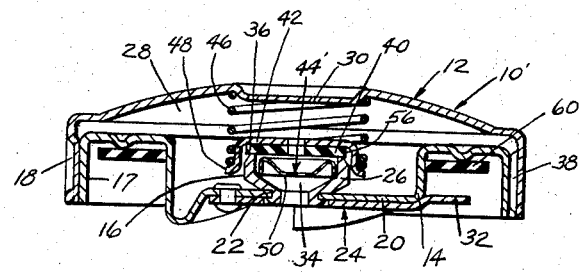
Fig. 3 is a vertical cross-sectional view of a slightly modified version of the cap of Fig. 1.
Figure 4:
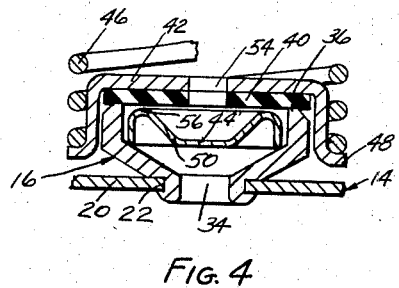
Fig. 4 is an enlarged vertical cross-sectional view of the pressure and vacuum relief valves incorporated in the cap of Fig. 3.
Figure 5:
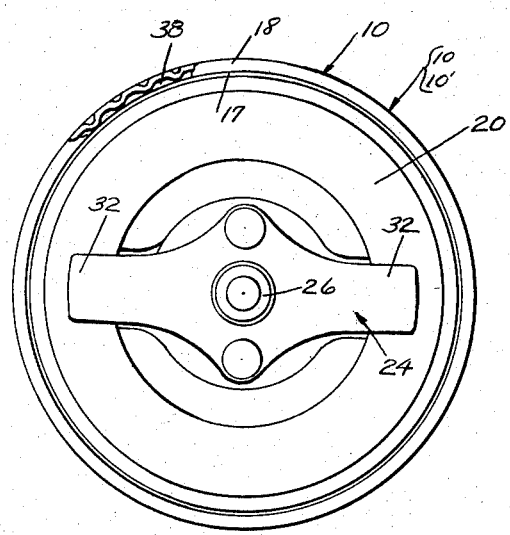
Fig. 5 is a bottom elevation of either of the caps of Fig. 1 or 3.

Figs. 3 and 4 disclose a modified form 10¹ of the cap of Figs. 1 and 2, with the sole variation being in providing a free floating vacuum relief valve 44¹ in place of a spring tensioned one as disclosed in Figs. 1 and 2. As such valve 44¹ moves to closed position under a slight pressure in the tank to which cap 10¹ is applied or by reason of surge of the fluid in said tank acting upon the underside thereof whereby an effective seal is had as conditions necessitate to prevent seepage of fluid through the cap.

Figure 7:
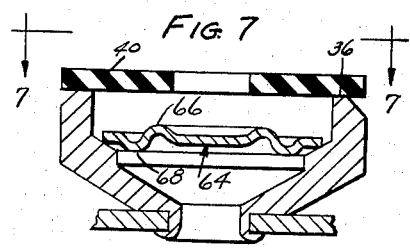
Figure 6:
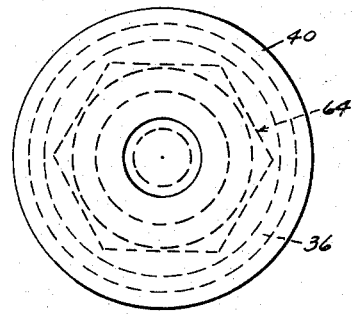
Fig. 6 is a modified form of vacuum relief valve from that shown in the caps of Fig. 1 or 3; and, Fig. 7 is a view taken substantially along lines 7—7 of Fig. 6.

Figs. 6 and 7 disclose a modified form 64 of vacuum relief valve 44¹ whereby the valve can be assembled in either of two positions, that is, as disclosed or inverted without effecting the operation of the cap of which it forms a part. This design is essentially important so as to safeguard against human error in the assembling of the valve in a cap in the production thereof.

Valve 64 is provided opposite axially disposed radially inner and outer annular ribs 66 and 68 each of which is adaptable to seating engagement on sealing element 40 of the cap depending on the assembled position of said valve. As a means of insuring for the permissible passage of gases, air or the like from the tank or the ingress of air to the tank around valve 64 to which the cap is applied depending upon the pressure or vacuum condition internally of the tank, the valve is hexagonal in shape whereby a clearance is had annularly between the outer periphery of the valve and the valve chamber formed by sleeve 26 within which it is disposed.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. A container closure comprising a cover member, a member having a centrally apertured portion, said apertured member secured to the cover member and providing with the cover member a chamber therebetween, a sleeve extending into said chamber and comprising an annular wall portion and a base portion and said sleeve being secured in close fitting relationship with the apertured portion of said apertured member, valve means supported on said sleeve and including a resiliently loaded valve having an opening therethrough, said annular wall portion of said sleeve disposed in telescoping relationship within said valve means, a sealing element interposed axially between said valve and one end of said sleeve and providing an annular seal between said sleeve and said resiliently loaded valve, said sealing element having an opening therethrough coinciding with the opening in said valve, and a second valve disposed within said sleeve and being free to move to a sealing position in which said second valve forms an annular seal with said sealing element and to an open position in which said second valve is spaced from said sealing element and supported on said base portion of said sleeve, said openings through the valve and sealing element providing communication, through the sleeve, between said chamber and a zone disposed on the axial opposite side of said apertured member, means secured to the apertured member for attaching the closure to a container to which it is adapted and vent means providing communication between the atmosphere and said chamber.

2. A closure according to claim 1 wherein a coil spring, disposed in the chamber between a part of the cover member and the first mentioned valve, resiliently loads said valve.

3. A closure according to claim 1 wherein the sealing element is annular in form, the second valve is circular and wherein the sealing element annularly engages said end of the sleeve near the outer periphery of the element and the second mentioned valve annularly engages the sealing element radially outwardly of the opening in the sealing element and radially inwardly of the engagement between the sealing element and said end of the sleeve.

4. A closure comprising a substantially cup-shaped member, a second substantially cup-shaped member, secured within the first cup-shaped member, having a central opening therethrough and forming with the first cup-shaped member a chamber therebetween communicating with the exterior of the closure through the opening in the second cup-shaped member, a combination pressure and relief valve assembly disposed in said chamber for controlling communication of the chamber through the opening in the second cup-shaped member including a stepped bore sleeve having a free end portion, a base portion secured on the second cup-shaped member in said central opening, an annular sealing element having an annular portion thereof engageable with the free end of the sleeve, a resiliently loaded annular element engageable with one axial face of the sealing element opposite from the face of the element engaging the end of the sleeve and disposed telescopically over said sleeve, said sealing element and said annular element having communicating apertures therein and a valve element, disposed within the larger diametered portion of the bore engageable with the sealing element on the face thereof engageable with the sleeve and forming a seal between said central opening and said apertures, said valve element being movable to a position wherein said valve element is supported on said base portion of said sleeve whereby communication is allowed between said apertures and said central opening, and vent means providing communication between the atmosphere and the chamber.

5. A closure according to claim 4 wherein the vent means are axially extended circumferentially spaced passages formed between axially extended skirt portions of the members and wherein means are secured to the second cup-shaped member for attaching the closure to a container for which it is adapted.

(References on following page)

References Cited in the file of this patent

UNITED STATES PATENTS

| | | |
|---|---|---|
| 2,139,395 | Walker | Dec. 6, 1938 |
| 2,232,113 | Katcher | Feb. 18, 1941 |
| 2,334,948 | Newton | Nov. 23, 1943 |
| 2,406,502 | Lines | Aug. 27, 1946 |
| 2,496,883 | McKalip | Feb. 7, 1950 |
| 2,675,093 | McCall | Apr. 13, 1954 |
| 2,684,780 | Friend | July 27, 1954 |